(12) United States Patent
Bauman et al.

(10) Patent No.: US 7,996,628 B2
(45) Date of Patent: Aug. 9, 2011

(54) CROSS ADAPTER SHARED ADDRESS TRANSLATION TABLES

(75) Inventors: Ellen M. Bauman, Rochester, MN (US); Timothy J. Schimke, Stewartville, MN (US); Lee A. Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 12/030,957

(22) Filed: Feb. 14, 2008

(65) Prior Publication Data

US 2009/0210646 A1  Aug. 20, 2009

(51) Int. Cl.
*G06F 12/00* (2006.01)
(52) U.S. Cl. ......... 711/147; 711/152; 711/163; 711/206
(58) Field of Classification Search .................. 711/202, 711/147, 152, 163, 206
See application file for complete search history.

(56) References Cited

U.S. PATENT DOCUMENTS

| | | | | |
|---|---|---|---|---|
| 5,630,087 | A * | 5/1997 | Talluri et al. | 711/202 |
| 6,085,296 | A * | 7/2000 | Karkhanis et al. | 711/147 |
| 6,748,499 | B2 * | 6/2004 | Beukema et al. | 711/147 |
| 7,472,252 | B2 * | 12/2008 | Ben-Zvi | 711/203 |

* cited by examiner

*Primary Examiner* — Matthew Bradley
(74) *Attorney, Agent, or Firm* — Rabin & Berdo, PC

(57) ABSTRACT

A method, computer program product and computer system for allocating shared address translation tables for memory regions of multiple I/O adaptors, which includes allocating an address translation table to be shared between the memory regions, creating a hardware context for each memory region, and sharing the address translation table across multiple adaptors.

15 Claims, 3 Drawing Sheets

CROSS ADAPTER SHARED ADDRESS TRANSLATION TABLES

BACKGROUND

1. Technical Field

The present invention relates to memory region mapping optimization for input/output (I/O) adaptors. More specifically, it relates to a method and system for allocating shared address translation tables for memory regions of multiple I/O adaptors.

2. Background Information

Efficient I/O technologies are in great demand to provide high-speed data transfers and ultra low latencies for highly reliable and scalable computing and storage. Examples of such technologies include InfiniBand, an architecture and specification for data flow between processors and I/O devices that promises greater bandwidth and high expandability, and the Host Ethernet Adapter (HEA) which is a virtualized Ethernet adapter integrated directly into the high-speed I/O bus and offers high throughput and low latency for Ethernet connections. These I/O technologies utilize memory regions for the buffers that are used for the send and receive queues. The buffers are used for moving data, e.g. in Direct Memory Access (DMA). The memory regions vary in size, from as small as 4 kilobytes (KB) to as large as 2 terabytes (TB). Such memory regions are comprised of Address Translation Tables, which are used to determine the real address that is to be used as the source or target for a DMA operation when performing local or remote accesses with virtual addresses.

SUMMARY

A method, computer program product and computer system for allocating shared address translation tables for memory regions of multiple I/O adaptors, which includes allocating an address translation table to be shared between the memory regions, creating a hardware context for each memory region, and sharing the address translation table across multiple adaptors.

DETAILED DESCRIPTION

Figure 1:
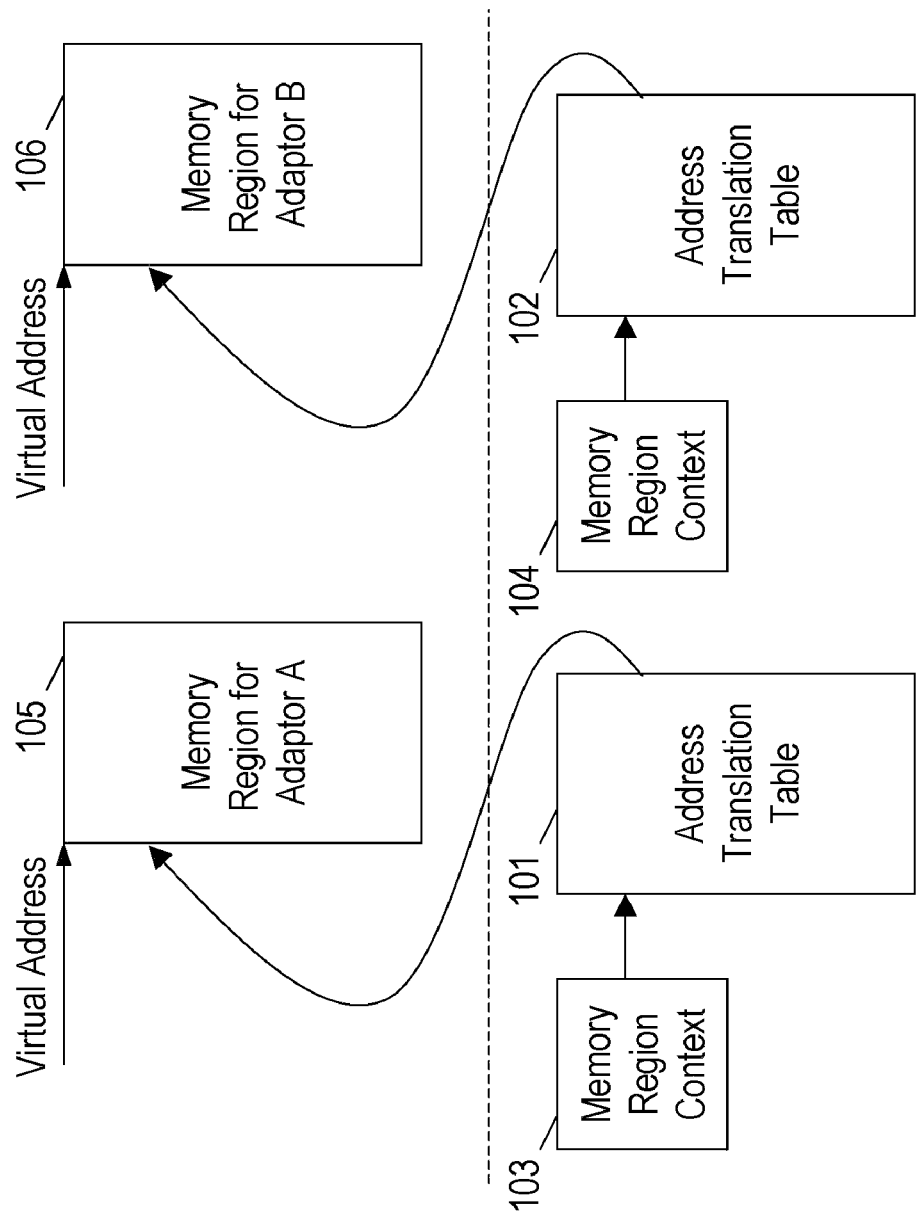
FIG. 1 is a block diagram of memory region mapping using address translation tables.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning to the present invention, Address Translation Tables are used to determine the real address that is to be used as the source or target for a DMA operation when performing local or remote accesses with virtual addresses. Address translation tables for I/O adapters consume a large amount of storage to map the pages contained in a memory region. For example, in a 4 KB page environment, each 2 megabytes (MB) of storage requires more than 4 KB to store the address translation tables. A 4 gigabytes (GB) memory region would require 8 MB to store the address translation tables. If a partition has 8 GB of storage, the resulting address translation tables would consume 16 MB of the storage. If this partition contains four adapters, it would take 64 MB of storage to map the entire partition memory for all four adapters. Often a partition will contain multiple adapters and will map the same large piece of storage for each adapter. Partition Operating Systems, e.g. Linux, often wish to register a memory region equal to the size of its available physical memory. Creating address translation tables each time thus becomes very costly because this physical memory is then unavailable for other uses, which consequently hurts overall system performance.

While the memory regions a device driver creates are very adapter specific, the address translation tables they refer to are not. The present invention enables a partition device driver to take the large memory block it wants to register and register it as shared across multiple adapters. This would be more efficient because there would then only be a single address translation table instead of multiple tables. As a result, the physical memory required to handle memory regions is reduced. At the same time, partition implementation remains unchanged and existing device drivers can be used. In addition, failover schemes become easier to implement. In a failover environment one can map the adapter resources identically across multiple resources. This simplifies the movement of the memory regions.

Address translation tables include pages of memory that are used to map virtual partition memory. These pages point to either further lists of pages, or physical addresses of actual partition page memory. The lowest level of the address translation tables will always point to the physical addresses for partition storage. The number of levels is dependent on the memory region size and the page size being mapped. With reference to FIG. 1, address translation tables 101 and 102 contain the pointers that point to the physical addresses of memory regions 105 and 106, respectively. Adapter hardware contexts are maintained to keep the set of reference pointers that point to the highest level of these address translation tables, the virtual address of the memory region being mapped and the protection scheme for the memory region. In FIG. 1, memory region contexts 103 and 104 are used to keep the adaptor hardware context for adaptor A and adaptor B, respectively. Local and remote keys (not shown in FIG. 1) are then created for the adapter device drivers to place in the work requests. These keys provide the adapter hardware with information to find the memory region contexts and then address translation tables.

Figure 2:
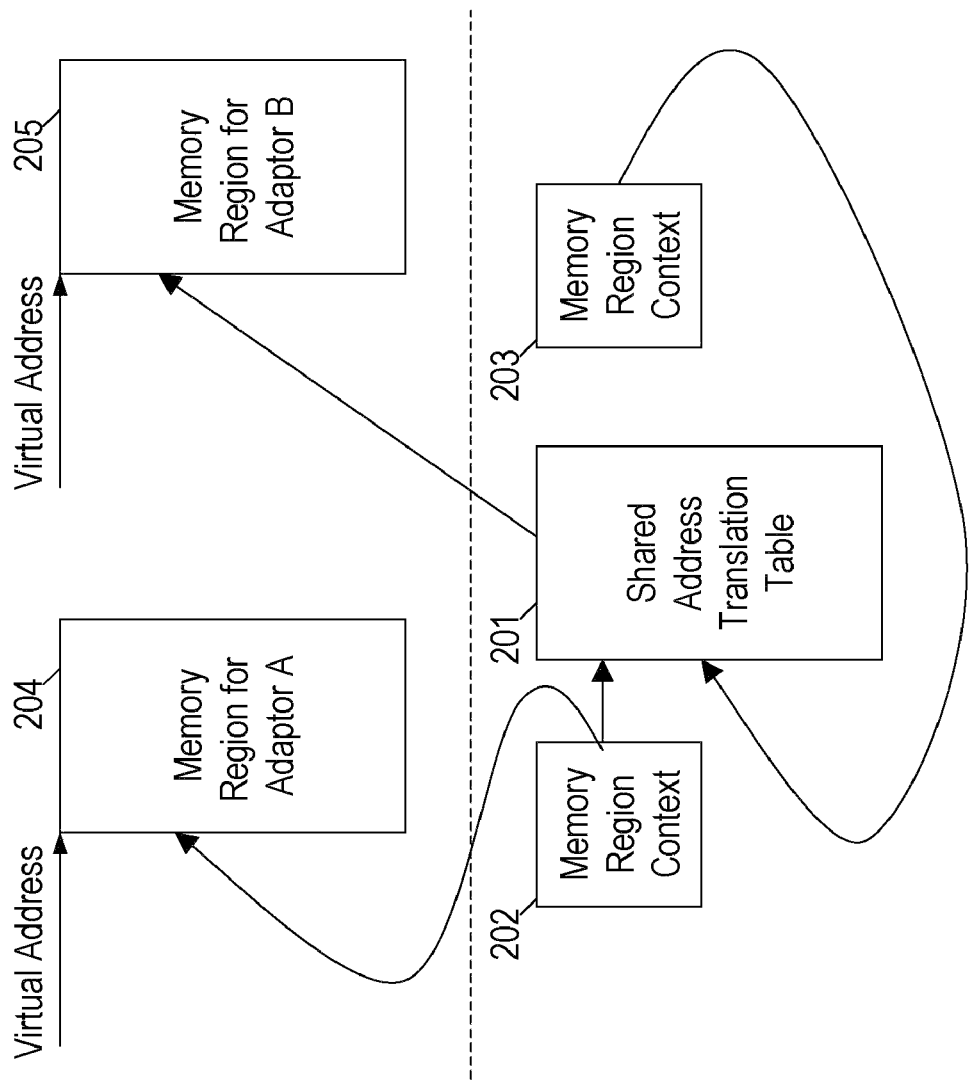
FIG. 2 is a block diagram of address translation table sharing for multiple I/O adaptors.

With reference to FIG. 2, in an embodiment of the present invention, an address translation table 201 can be shared between multiple memory regions 204 and 205. The address translation table 201 itself contains no reference to the hardware adapters that use it, and that information is stored in their respective adapter hardware contexts. Each memory region has its own hardware context 202 and 203, but the context then points at the shared address translation tables. A single adapter is allowed to share one of these address translation tables across multiple memory regions. The present invention takes the address translation tables and allows them to be shared across multiple adapters. The translation table pointers contained within the hardware contexts are assigned to point to the same shared address translation table. Thus, each adapter's hardware context would contain the same top-level addresses that reference the single address translation table. The only addition to the address translation table software objects would then be a counting mechanism (e.g. a counter) that is used to determine when an address translation table is destroyed when the memory region frees. The memory region objects are adapter specific. In order to support a cross adapter memory region, a communication mechanism is established between the memory region objects to determine if a mapping for the adapter already exists. In an alternate embodiment, the allocating calls are changed to indicate the existence of the memory region to be shared, and to pass down the adapters address and local key of the memory region to share with, to simplify the searching for the existing memory region. The adapter can then use those pieces of information to fetch the address translation tables from the base adapter.

An example where the present invention can be applied is when an I/O adapter A is fast-failing to another I/O adapter B. In this case, adapter A is the normal operational adapter, and adapter B is a redundant adapter used to mirror adapter A. Adapter A allocates a memory region and creates address translation tables that point to the memory region. When adapter A fails over to adapter B, a new memory region is created in adapter B and the highest level pointers to the address translation table for memory region that A allocates are then copied into adapter B's new memory region. For the transition to be completely seamless, the memory region is then created at the exact same hardware context location in adapter B providing the same local and remote keys to the user.

Figure 3:
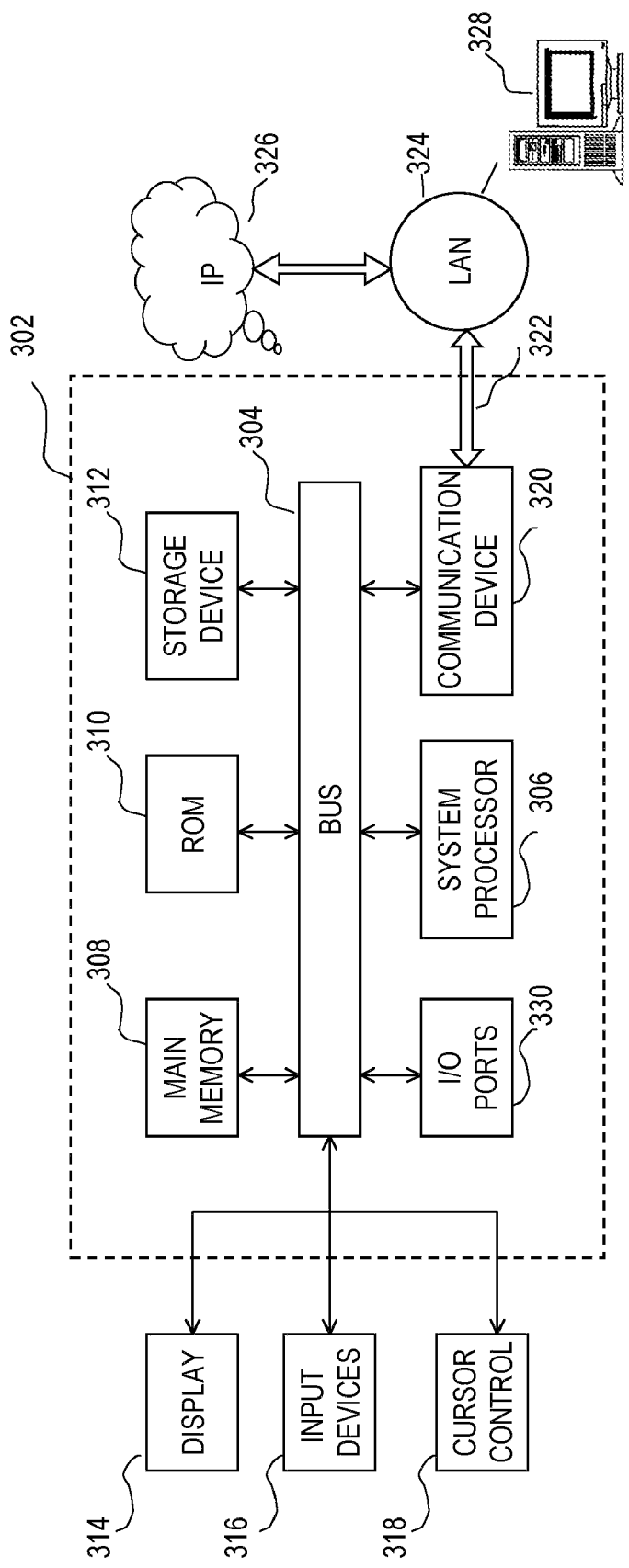
FIG. 3 is a conceptual diagram of a computer system that can utilize the present invention.

FIG. 3 illustrates a computer system (302) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (304) or other communication mechanism for communicating information and a processor (306) coupled with bus (304) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (306). In addition, main memory (308) may be used for storing temporary variables or other intermediate information during execution of instructions to be executed by processor. The computer system further includes a read only memory (ROM) 310 or other static storage device (e.g., programmable ROM (PROM), erasable PROM (EPROM), and electrically erasable PROM (EEPROM)) coupled to bus 304 for storing static information and instructions for processor. A storage device (312), such as a magnetic disk or optical disk, is provided and coupled to bus for storing information and instructions. This storage device is an example of a computer readable medium.

The computer system also includes input/output ports (330) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct 15 memory access (DMA) bus). The computer system may additionally include a compact disc reader, a compact disc reader-writer unit, or a compact disc jukebox, each of which may be connected to the same device bus or another device bus.

The computer system may be coupled via bus to a display (314), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (316) and a cursor control (318), for communicating information and command selections to processor (306). Such command selections can be implemented via voice recognition hardware and/or software functioning as the input devices (316). The cursor control (318), for example, is a mouse, a trackball, cursor direction keys, touch screen display, optical character recognition hardware and/or software, etc., for communicating direction information and command selections to processor (306) and for controlling cursor movement on the display (314). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (320) provides a two-way data communication coupling to a network link (322) that may be connected to, for example, a local network (324). For example, the communication interface (320) may be a network interface card to attach to any packet switched local area network (LAN). As another example, the communication interface (320) may be an asymmetrical digital subscriber line (ADSL) card, an integrated services digital network (ISDN) card or a modem to provide a data communication connection to a corresponding type of telephone line. Wireless links may also be implemented via the communication interface (320). In any such implementation, the communication interface (320) sends and receives electrical, electromagnetic or optical signals that carry digital data streams representing various types of information.

Network link (322) typically provides data communication through one or more networks to other data devices. For example, the network link may provide a connection to a computer (326) through local network (324) (e.g., a LAN) or through equipment operated by a service provider, which provides communication services through a communications network (328). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for sharing an address translation table for multiple I/O adaptors, comprising:
    allocating a plurality of memory regions each for one of the multiple I/O adaptors;
    building the address translation table having a top-level address;
    creating a plurality of hardware contexts each corresponding to one of the plurality of memory regions, each hardware context including a translation table pointer, a virtual address of the corresponding memory region, and a protection scheme of the corresponding memory region; and
    assigning the top-level address of the address translation table to the translation table pointer of each of the plurality of hardware contexts.

2. The method of claim 1, further comprising:
    establishing a first mechanism to keep track of the address translation table; and
    establishing a second mechanism to avoid duplicated mapping.

3. The method of claim 2, wherein the establishing a first mechanism comprises establishing a counting mechanism to determine when the address translation table is destroyed.

4. The method of claim 2, wherein the establishing a second mechanism comprises establishing a communication mechanism between the memory regions to determine if an adaptor mapping already exists.

5. The method of claim 2, wherein the establishing a second mechanism comprises changing allocation calls to indicate an existence of a memory region to be shared.

6. A computer program product for sharing an address translation table for multiple I/O adaptors, the computer program product comprising:
    a non-transitory computer usable medium having computer usable program code embodied therewith, the computer usable program code comprising:
        instructions to allocate a plurality of memory regions each for one of the multiple I/O adaptors;
        instructions to build the address translation table having a top-level address;
        instructions to create a plurality of hardware contexts each corresponding to one of the plurality of memory regions, each hardware context including a translation table pointer, a virtual address of the corresponding memory region, and a protection scheme of the corresponding memory region; and
        instructions to assign the top-level address of the address translation table to the translation table pointer of each of the plurality of hardware contexts.

7. The computer program product of claim 6, further comprising:
    instructions to establish a first mechanism to keep track of the address translation table; and
    instructions to establish a second mechanism to avoid duplicated mapping.

8. The computer program product of claim 7, wherein the instructions to establish a first comprise instructions to establish a counting mechanism to determine when the address translation table is destroyed.

9. The computer program product of claim 7, wherein the instructions to establish a second mechanism comprise instructions to establish a communication mechanism between the memory regions to determine if an adaptor mapping already exists.

10. The computer program product of claim 7, wherein the instructions to establish a second mechanism comprise instructions to change allocation calls to indicate an existence of a memory region to be shared.

11. A computer system, comprising:
    a processor;
    a memory operatively coupled with the processor;
    a storage device operatively coupled with the processor and the memory; and
    a computer program product for sharing an address translation table for multiple I/O adaptors, the computer program product comprising:
        a non-transitory computer usable medium having computer usable program code embodied therewith, the computer usable program code comprising:
            instructions to allocate a plurality of memory regions each for one of the multiple I/O adaptors;
            instructions to build the address translation table having a top-level address;
            instructions to create a plurality of hardware contexts each corresponding to one of the plurality of memory regions, each hardware context including a translation table pointer, a virtual address of the corresponding memory region, and a protection scheme of the corresponding memory region; and
            instructions to assign the top-level address of the address translation table to the translation table pointer of each of the plurality of hardware contexts.

12. The system of claim 11, wherein further comprising:
    instructions to establish a first mechanism to keep track of the address translation table; and
    instructions to establish a second mechanism to avoid duplicated mapping.

13. The system of claim 12, wherein the instructions to establish a first mechanism comprise instructions to establish a counting mechanism to determine when the address translation table is destroyed.

14. The system of claim 12, wherein the instructions to establish a second mechanism comprise instructions to establish a communication mechanism between the memory regions to determine if an adaptor mapping already exists.

15. The system of claim 12, wherein the instructions to establish a second mechanism comprise instructions to change allocation calls to indicate an existence of a memory region to be shared.

* * * * *